(12) United States Patent
Staples

(10) Patent No.: US 11,932,158 B2
(45) Date of Patent: Mar. 19, 2024

(54) BOW STOP

(71) Applicant: G.S. UNLIMITED ENTERPRISES PTY LTD, Highpoint (AU)

(72) Inventor: Gregory Staples, Highpoint (AU)

(73) Assignee: G.S. UNLIMITED ENTERPRISES PTY LTD (AU)

( * ) Notice: Subject to any disclaimer, the term of this patent is extended or adjusted under 35 U.S.C. 154(b) by 831 days.

(21) Appl. No.: 16/977,519

(22) PCT Filed: Mar. 13, 2019

(86) PCT No.: PCT/AU2019/050224
§ 371 (c)(1),
(2) Date: Sep. 2, 2020

(87) PCT Pub. No.: WO2019/173870
PCT Pub. Date: Sep. 19, 2019

(65) Prior Publication Data
US 2021/0001764 A1    Jan. 7, 2021

(30) Foreign Application Priority Data
Mar. 13, 2018    (AU) ................................ 2018900823

(51) Int. Cl.
*B60P 3/10*    (2006.01)
*B66D 1/74*    (2006.01)

(52) U.S. Cl.
CPC .......... *B60P 3/1066* (2013.01); *B66D 1/7489* (2013.01)

(58) Field of Classification Search
CPC .................................................. B60P 3/1066
See application file for complete search history.

(56) References Cited

U.S. PATENT DOCUMENTS

| 3,149,735 A | * | 9/1964 | Bleecker | ............... B60P 3/1033 |
|---|---|---|---|---|
| | | | | 414/506 |
| 3,177,839 A | * | 4/1965 | Nolf | .......................... E02B 3/24 |
| | | | | 114/230.18 |
| 3,308,975 A | | 3/1967 | Despilles | |
| 3,750,805 A | * | 8/1973 | Finney | .................. B60P 3/1058 |
| | | | | 414/536 |

(Continued)

FOREIGN PATENT DOCUMENTS

DE             29512586 U1    12/1995

OTHER PUBLICATIONS

International Search Report for Application No. PCT/AU2019/050224 dated Apr. 10, 2019, 3 pages.

(Continued)

*Primary Examiner* — Jacob D Knutson
(74) *Attorney, Agent, or Firm* — Lerner David LLP

(57) ABSTRACT

A bow stop including a Vee portion having a front, bow engaging concave surface and rear surface. The bow stop further having a connection portion for connection to a trailer. The Vee portion has a rigid body or chassis (hereinafter "body") and a polymer cover, and the polymer cover overlies a front, Vee-shaped surface of the body. The connection portion is configured for positioning between a pair of spaced apart and generally parallel upstanding arms of a bow stop support structure of a boat trailer and the connection portion includes a connector for connection to the upstanding arms.

17 Claims, 4 Drawing Sheets

(56) References Cited

U.S. PATENT DOCUMENTS

| | | | | |
|---|---|---|---|---|
| 3,831,790 A * | 8/1974 | Farris | ............... | B60P 3/1058 |
| | | | | D12/101 |
| 3,938,829 A * | 2/1976 | Anderson | ............ | B60P 3/1066 |
| | | | | 280/414.1 |
| 4,209,279 A * | 6/1980 | Aasen | ............... | B60P 3/1075 |
| | | | | 280/414.1 |
| 4,463,965 A * | 8/1984 | Lawson | ............ | B60P 3/1033 |
| | | | | 414/536 |
| 4,623,161 A * | 11/1986 | Sprague | ............ | B60P 3/1075 |
| | | | | 114/344 |
| 4,974,865 A * | 12/1990 | Capps | ............... | B60P 3/1033 |
| | | | | 410/2 |
| 5,120,079 A * | 6/1992 | Boggs | ............... | B60P 3/1075 |
| | | | | 414/536 |
| 5,299,903 A * | 4/1994 | Kesselring | ......... | B60P 3/1075 |
| | | | | 414/529 |
| 5,599,035 A * | 2/1997 | Spence | ............ | B60P 3/1066 |
| | | | | 280/414.1 |
| 5,876,166 A * | 3/1999 | Hyslop | ............ | B60P 3/1075 |
| | | | | 410/86 |
| 5,949,329 A * | 9/1999 | Woodard | ............ | B60P 3/1075 |
| | | | | 340/687 |
| 6,402,445 B1 * | 6/2002 | Smiley | ............ | B60P 3/1075 |
| | | | | 410/2 |
| 7,066,102 B1 * | 6/2006 | Tossavainen | ......... | B63B 21/00 |
| | | | | 114/230.1 |
| 2013/0087986 A1 | 4/2013 | Stansfield | | |
| 2013/0147156 A1 * | 6/2013 | Velton | ............... | B60P 3/1066 |
| | | | | 280/414.1 |

OTHER PUBLICATIONS

Extended European Search Report including Written Opinion for Application No. 19768220.6 dated Nov. 5, 2021, pp. 1-7.

* cited by examiner

BOW STOP

CROSS-REFERENCE TO RELATED APPLICATIONS

The present application is a national phase entry under 35 U.S.C. § 371 of International Application No. PCT/AU2019/050224 filed 13 Mar. 2019, published in English, which claims priority from Australian provisional application No. 2018900823, filed 13 Mar. 2018, all of which are incorporated herein by reference.

TECHNICAL FIELD

The present invention relates to a bow stop or bow stopper for attachment to a trailer used for the transport and launch/retrieval of boats, principally motor boats. The expression "bow stop" is well known in the industry to describe the type of device that is the subject of this invention, but the device could be known by other names such as a "bow stopper". For the purposes of this specification, the device of this invention will be called a "bow stop", although it is to be appreciated that it could be known by other names.

BACKGROUND OF INVENTION

The following discussion of the background to the invention is intended to facilitate an understanding of the invention. However, it should be appreciated that the discussion is not an acknowledgement or admission that any aspect of the discussion was part of the common general knowledge as at the priority date of the application.

Bow stops form part of a boat trailer and are placed at a forward end of the trailer for engagement with the bow of a boat during loading of a boat onto a trailer and during subsequent transport of the boat on the trailer. Importantly, a bow stop locates the forward end of a boat on a trailer in a towing position and in that position, the boat is normally continuously urged into contact with the bow stop by use of a winch and/or other securing devices, so that the front end of the boat is aligned and securely located and connected to the trailer in the towing position.

A bow stop has a concave or Vee shape portion to accept the leading apex of the bow when a boat is being loaded onto a trailer. By forming the bow stop in this manner, any frontal misalignment of the boat as it moves onto the trailer will be corrected by the apex of the bow shifting to the centre of the concave or Vee shape portion of the bow stop as the bow moves into the bow stop. That is, the bow stop tends to centre the bow of the boat when the boat engages the bow stop.

Boats can be driven from the water and fully onto a trailer and into a towing position if the boat operator has sufficient skill to accurately align the bow of the boat relative to the trailer so that the apex of the bow is received within the Vee portion of the bow stop as the boat is driven onto the trailer. However, as most bow stops are relatively small, the Vee portion of the bow stop presents a relatively small catchment area for the bow to be aligned with and driven into and so many boat operators do not have the sufficient skill required. Accordingly, many boat operators adopt the less preferred alternative approach of driving the boat most of the way onto the trailer but leaving the bow of the boat short of the bow stop, and thereafter winching the boat the final distance into the towing position. This latter approach is not preferred because it is more time consuming than driving a boat fully or completely onto a trailer and requires either the boat operator to move from the boat to the trailer to access the winch, or requires two operators; one on the boat and the other on the trailer. Given that boat ramps are often busy, there is benefit if the less time consuming approach of driving the boat fully onto the trailer be adopted more regularly.

Various forms of bow stops exist already. Many bow stops are formed from plastic and include a bolt hole extending laterally across the bow stop so that the bow stop can be connected by bolting between a pair of upstanding arms that connect to the trailer body and that form a bow stop support structure. These forms of bow stops include circular bow stops (illustrated in FIG. 4 herein) in which the bolt hole forms an axis about which the bow stop can rotate as the bow of a boat engages the bow stop. This rotational movement prevents sliding movement of the boat bow relative to the bow stop and so can prevent wear of the bow and/or the bow stop.

Prior art plastic bow stops have the disadvantage discussed earlier herein that they tend to provide a relatively small catchment area for the bow of a boat and while a bow stop that presents a larger catchment area would be desirable, the size of plastic bow stops is limited because of strength limitations inherent in the properties of plastic itself. Increasing the size of a plastic bow stop carries the risk of damage upon engagement by a boat bow if the bow stop has too great a dimension from side to side. Damage to the bow stop can include cracking of the plastic and/or bending of the bolt that connects the bow stop to the bow stop support structure. Either outcome can require the bow stop to be replaced. The strength of a plastic bow stop can be increased by increasing the bulk of the bow stop, but this likewise is not desirable for various reasons including that the bow stop is positioned amongst other equipment and so increasing the bulk of the bow stop can affect the positioning of that other equipment. Thus it is necessary to minimise the length of a plastic bow stop and this often means that the catchment area of the Vee portion is too small for less skilled boat operators to adopt the approach of directly driving the boat fully onto the trailer.

Wider bow stops that present a wider or larger catchment area can be provided by customising the trailer to include a support structure to which customised rubber bumpers or the like can be attached in a Vee configuration or orientation. These arrangements tend however to be suitable for a particular type or shape of boat only and have largely only been adopted by backyard trailer manufacturers or boat owners themselves that customise their own trailer to suit their own boat. Trailer manufacturers of any scale tend to prefer bow stops that are connectible to and removable from a relatively universal trailer structure, so that the trailer itself is not required to be modified to provide a bow stop of a particular size or dimension.

A bow stop that presents a wider or larger catchment area without the disadvantages discussed above, would therefore be desirable.

Another problem associated with some current bow stops occurs where rotation of the bow stop is not a functional requirement as with the circular bow stops discussed above. Non-circular bow stops can rotate about the axis of the bolt that is used to secure them in place on the bow stop support structure if the load with which the boat bow strikes the bow stop is sufficient and the position at which the boat bow strikes the bow stop is not within the Vee portion of the bow stop. If the bow stop rotates, the bolt connection can loosen and the Vee portion will shift, both of which require the bow stop to be tightened and reset. If there has been a sufficient rotation of the bow stop that has gone unnoticed when the next loading of a boat onto the trailer occurs, the bow of the boat might not be caught by the bow stop and there can be resulting damage to both the bow and the trailer.

An arrangement that prevents unwanted rotation of a bow stop would therefore be desirable.

The bow stop support structure is normally an upstanding structural part of a trailer and is often the same part to which a winch is fitted. Often the support structure is or comprises a pair of spaced apart parallel members that connect to a post or structural member at one end and that connect to the bow stop at the other end. The bow stop extends across and connects the members. The bow stop can thus form a structural part of that support structure, so that any loosening of the bow stop or any distortion or rotation of the bow stop can affect the structural integrity of the upstanding structural part.

The bow stop itself and the structure to which the bow stop is mounted must be sufficiently robust in order to withstand and absorb the force of engagement with the bow of the boat as the boat is loaded onto the trailer. Boats that can be transported by trailer can have a weight in the order of between 250 kg and about 3000 kg and while the speed of the boat as it engages the bow stop is ordinarily low, there can nevertheless be significant momentum that the bow stop and the bow stop support structure is required to arrest. Moreover, there must be continued secure engagement between the bow of the boat and the bow stop to ensure secure and stable location of a boat on a trailer, particularly during transport. The potential for damage to the bow stop and/or the support structure by inaccurate alignment of the bow with the bow stop during loading of a boat onto a trailer further discourages less skilled boat operators from adopting the approach of directly driving the boat fully onto the trailer.

The present invention seeks to provide a bow stop that addresses one or more of the disadvantages associated with prior art bow stops.

SUMMARY OF INVENTION

According to the present invention there is provided a bow stop including a Vee portion having a front, bow engaging concave surface and rear surface, and a connection portion for connection to a trailer, the Vee portion having a rigid body or chassis (hereinafter "body") and a polymer cover, and the polymer cover overlying a front, Vee-shaped surface of the body, the connection portion being configured for positioning between a pair of spaced apart and generally parallel upstanding arms of a bow stop support structure of a boat trailer and the connection portion including a connector for connection to the upstanding arms.

The present invention also provides a boat trailer having a bow stop support structure that includes a pair of spaced a part and generally parallel upstanding arms, and a bow stop that includes a Vee portion having a front, bow engaging concave surface and rear surface, and a connection portion, the connection portion being positioned between the pair of upstanding arms and being connected to the pair of upstanding arms by a connector, the Vee portion having a rigid body and a polymer cover, and the polymer cover overlying a front, Vee-shaped surface of the body.

A reference to "concave" herein is intended to include a pair of surfaces that incline, either linearly or in a curve, to or towards an apex, that can in most cases will be centred between the pair of surfaces. A bow stop according to the invention advantageously includes a Vee portion that has a rigid body that provides strength and stiffness which improves the resistance of the bow stop to bending, distorting or breaking under an impact load applied by the bow of a boat during loading of a boat onto a trailer. The strength provided by the rigid body means that the Vee portion can have a wider or larger catchment area compared at least to current plastic bow stops. This has the advantage that less experienced boat operators will more likely be able to align the bow of a boat with the Vee portion and thus improves the likelihood of the boat operator being able to drive the boat directly and fully onto the trailer without using the winch. A bow stop according to the invention advantageously can also be arranged to fit existing bow stop support structures provided in existing trailers so that a bow stop according to the invention can be fitted to new trailers that have a bow stop support structure that has a pair of spaced apart and generally parallel upstanding arms, or a bow stop according to the invention can replace an existing bow stop of the prior art that is fitted to a bow stop support structure that has a pair of spaced apart and generally parallel upstanding arms. A bow stop according to the invention advantageously therefore does not require the bow stop support structure to be reconfigured where it already includes a pair of spaced apart and generally parallel upstanding arms.

The Vee portion can be formed as a full Vee with a pair of arms connected together at a central apex and extending in opposite directions. The arms will normally be the same length so that the Vee portion is symmetrical about the apex, although it is within the scope of the present invention that the arms have different lengths to form an asymmetric Vee. In alternative arrangements, the Vee portion can comprise a pair of arms or abutments that are disconnected and so do not extend to a central apex, but nevertheless present a pair of surfaces that are inclined relative to each other in a Vee configuration or orientation for engagement by a boat bow. The Vee portion can thus present a continuous surface or a discontinuous surface.

The rigid body can be formed in a Vee shape and the polymer cover connected thereto. Alternatively, the rigid body can be formed other than in a Vee shape as long as the body presents a surface that has a Vee shape. The rigid body could, for example, be formed as a block in which one surface of the block has a surface that is Vee shaped. The current preference however is to form the body in a Vee shape with a pair of diverging arms that diverge at an angle from a central apex.

The rigid body can be formed of any suitable rigid material but metal is preferred. Any suitable metal can be used, such as aluminium. Aluminium has the advantage of being rust resistant, which is beneficial in marine environments, and aluminium is readily cast, which presents one form of manufacture for the body. Other metal could however be employed, such as cast steel, while the manufacturing method to form the body can include fabrication rather than casting.

The Vee portion of the bow stop forms a Vee shaped front surface which can be of any suitable included angle and of any suitable width or span. These dimensions can be selected to suit different bow shapes of different boats, while the width or span of the front surface can be selected to give boat operators a greater catchment area with which to align a boat bow during driving of the boat onto a trailer as compared to prior art bow stops. In one form of the present invention, the included angle of the front surface of the Vee portion is about 120°.

The width or span of the front surface of the Vee portion can be much greater than in current plastic prior art bow stops by the provision of the rigid body. One current plastic bow stop known to the Applicant has a width or span of about 75 mm, while another has a width or span of about 105 mm. However, one form of the present invention provides a Vee portion with a width or span of about 370 mm, being more than three times the width or span of the prior art bow stops know to the Applicant. The width or span of the front surface can be selected as required and can be greater or lesser than the example given above.

The provision of a polymer cover overlying the front surface of the rigid body advantageously provides a soft or cushioning abutment or engagement surface that the apex of the bow of a boat can contact during loading of a boat onto a trailer. This advantageously means that the surface of the rigid body over which the polymer cover extends does not itself need to be machined smooth or otherwise treated as it does not come into contact with the boat bow. Thus, if the rigid body is cast, the cast surface of the body can be overlaid by the polymer cover without further surface treatment. The polymer cover can present a front surface for engagement with the bow of a boat which is flat or cambered. The height or depth of the front surface can be greater towards the apex that at each of the opposite ends. The height or depth can increase from the opposite ends to the apex at a constant rate.

The polymer cover can be of the same material as plastic bow stops are currently manufactured so that the same material properties that boat operators are currently used to can be reproduced in a bow stop of the present invention. The polymer cover can be made of polyurethane for example, or other suitable polymers. The thickness of the polymer cover can be selected to provide the level of cushioning required but a thickness of about 5 mm to 20 mm is considered appropriate.

The polymer cover can completely cover the front surface of the body, or it can cover just the sections of the front surface that the bow of a boat will contact during loading of a boat onto a trailer. Thus, the entire front surface of the body might not be covered by the polymer cover, although the preference is for the entire front surface of the body to be covered by the polymer cover. The polymer cover can extend to cover other sections of the body in addition to the front surface and can for example, cover upper and lower surfaces or edges of the body, ends of the body and the rear of the body. In some forms of the invention, the body is completely covered by the polymer cover. This arrangement is beneficial for the protection of the body, but also, there are advantages in the manufacture and connection of the polymer cover to the body by the polymer cover completely enveloping or wrapping around the body. The polymer cover can for example be cast or moulded about the body. The polymer cover can be cast or moulded about the body so that the cover completely envelopes the body in close or face to face contact with the external surface of the body. In other words, there can be a tight connection between the polymer cover and the body as a result of the casting or moulding process and without the need for adhesives or other fixing arrangements. This enables the polymer cover to be fixed to or about the body so that there is no movement between the body and the polymer cover during engagement with the bow of a boat. This can also be achieved by casting the polymer cover about a portion of the body rather than the entire body.

The polymer cover can also partly or fully cover the connection portion. In some forms of the invention, the connection portion is formed integrally to the body and extends from the rear surface of the body and in these forms of the invention, the polymer cover can also extend to overlie parts of the connection portion. In some forms of the invention, the polymer cover overlies a bottom surface of the connection portion and this can be useful to provide a soft or cushioning surface against which a bow eye might engage during loading of a boat onto a trailer. This can assist to protect the connection portion and the bow eye from damage. The connection portion can have a rear surface that is remote from the body and the polymer cover can also extend to overlie the rear surface. The rear surface can be formed to have recess for the polymer cover to extend into for locating or anchoring the polymer cover to the body. In some forms of the invention, the polymer cover can completely or substantially cover the body and the connection portion.

The Vee portion and the connection portion can be connected directly or indirectly together. In some forms of the invention, the body of the Vee portion is formed integrally with the connection portion and is of the same material. In some forms of the invention, that integral connection is by casting the body and the connection portion together. The connection portion can thus be formed of metal, such as aluminium or steel. Alternatively, the connection portion could be fixed to the body by bolts or screws, or the body and the connection portion can be welded or brazed together. The body and the connection portion can be of different materials which are connected together, so that for example, the body could be metal and the connection portion could be plastic. However, the preference is for the body and the connection portion to both be formed from metal and the further preference is for the body and the connection portion to be integrally formed and for the connection portion to extend from the rear surface of the body.

The connection portion can be connected (integrally or non-integrally) to the rear surface of the body and can extend further rearward from the rear surface for connection to a structural part of a trailer. The connection portion can connect to the structural part of the trailer in any suitable manner, but it is proposed that in some forms of the invention, the connection portion connect to the structural part of the trailer in the same way that current bow stops connect to a trailer. In this manner, a bow stop of the present invention can be connected to trailers that currently employ prior art bow stops without those trailers requiring modification. This means that trailer manufacturers can install bow stops according to the present invention without modification to their trailers, while consumers who have purchased a trailer with a prior art trailer can replace that bow stop with a bow stop according to the present invention.

As described earlier, some prior art bow stops have a bolt that extends through the bow stop for connection to a pair of spaced apart parallel members of the bow stop support structure of a trailer. For compliance with that type of prior art bow stop, the connection portion of a bow stop according to the present invention is sized or dimensioned for receipt between the parallel members and the bow stop can include a bolt or pin that extends through the connection portion for connection to the parallel members. In some forms of the invention, the connection portion can be formed as a mounting block with a bolt or pin hole extending therethrough. The block can form a structural member that connects upper ends of the parallel members. The block can have opposite sides that are respectively in facing engagement with, or which face an arm of the pair of arms of the bow stop support structure. The block can be square or rectangular. If the block extends integrally from the body of the Vee portion, the block can have top, bottom, rear and side surfaces that are flat or planar in a generally square or rectangular configuration, and be connected to the body of the Vee portion at the front of the block.

The parallel members and the block can thus complete a parallelogram that has structural rigidity due in part to the rigid nature of the connection portion. This differs from some prior art arrangements in which plastic bow stops are employed and which do not provide the same level of rigidity that a bow stop according to the present invention can provide, because of the propensity for the bow stops to distort and/or rotate during engagement of the bow of a boat with the bow stop.

The ability for trailer manufacturers to adopt bow stops according to the present invention without any modification, or without major modification is a significant benefit provided by the present invention. In order to accommodate the support structures of different trailers, the present invention can be provided with an adjustment facility or an adjustment mechanism. In some forms of the invention, the adjustment facility or an adjustment mechanism can employ one or more spacers, shims, washers or the like to take up space between the connection portion and the bow stop support structure. If a bolt or pin is used to connect the connection portion to the bow stop support structure, the bolt or pin can extend through the spacers, shims, washers or the like. In forms of the invention where the bow stop includes a mounting block with a bolt hole extending therethrough, the bow stop can include one or more spacers, shims, washers or the like that the bolt can extend through and the one or more spacers, shims, washers or the like can be added or removed to increase or decrease the width of the mounting block to properly fit the spacing between the parallel members that the bow stop connects to.

The present invention can also provide an arrangement that prevents unwanted rotation of a bow stop. This anti-rotation arrangement can comprise a connector that can connect to a structural part of the trailer, such as the bow stop support structure to which the bow stop attaches or connects. Thus, the bow stop can have a second connection portion in addition to the first connection portion with the second connection portion connecting to a different part or section of the trailer to the first connection portion. The second connection portion can be or accept a bolt or pin or the like that extends into or through an opening in a structural part of the trailer. The structural part of the trailer that the bolt or pin extends into or through does not have to be the bow stop support structure, although that support structure presents a convenient part of the trailer for the second connection portion to engage. In some forms of the invention, the first connection portion includes an opening to accept a bolt or pin as discussed above to connect with the bow stop support structure and the second connection portion can likewise accept a bolt or pin or the like that extends into or through a second opening in a structural part of the trailer that is spaced from the where the bolt or pin of the first connection portion connects to the trailer. The respective bolts or pins can be substantially coaxial but spaced apart. By the use of a second connection portion, the bow stop is prevented from rotating about the bolt or pin of the first connection portion by the bolt or pin of the second connection portion. This arrangement solves a problem associated with the prior art as described above whereby bow stops can rotate undesirably.

To improve the flexibility of installing a bow stop to a trailer support structure, the anti-rotation arrangement can include more than a single opening so that the best placed opening can be selected for use.

While the second connection portion can accept a bolt or pin, alternative configurations include that the second connection portion be formed as an abutment that abuts against a structural part of the trailer, or be formed as a slot that accepts a structural part of the trailer. The second connection portion could alternatively have other forms.

Anti-rotation can also be provided by the first connection portion, so that a separate second connection portion is not required. For example, in many forms of the invention, a bolt extends through the first connection portion to connect the first connection portion to a structural part of the trailer. The anti-rotation arrangement can thus comprise a bolt that tightens to the extent that the bow stop will be prevented from rotation under normal or even high loading that a boat applies to the bow stop during loading of a boat onto a trailer. A grade 8.8 bolt which can be used and tightened at high load without breaking could be used.

Alternatively, the anti-rotation arrangement can comprise a specific surface profile, pattern or shape applied to the first connection portion that resists rotation of the bow stop. This could be any form of surface that engages the support structure of the trailer (bow stop support arms for example) with high friction or which tends to grip the support structure. For example, the side walls of the first connection portion could be roughened or knurled, or casting points or patterns can be cast into or onto the side walls.

BRIEF DESCRIPTION OF DRAWINGS

In order that the invention may be more fully understood, some embodiments will now be described with reference to the figures in which.

DETAILED DESCRIPTION

Figure 1:
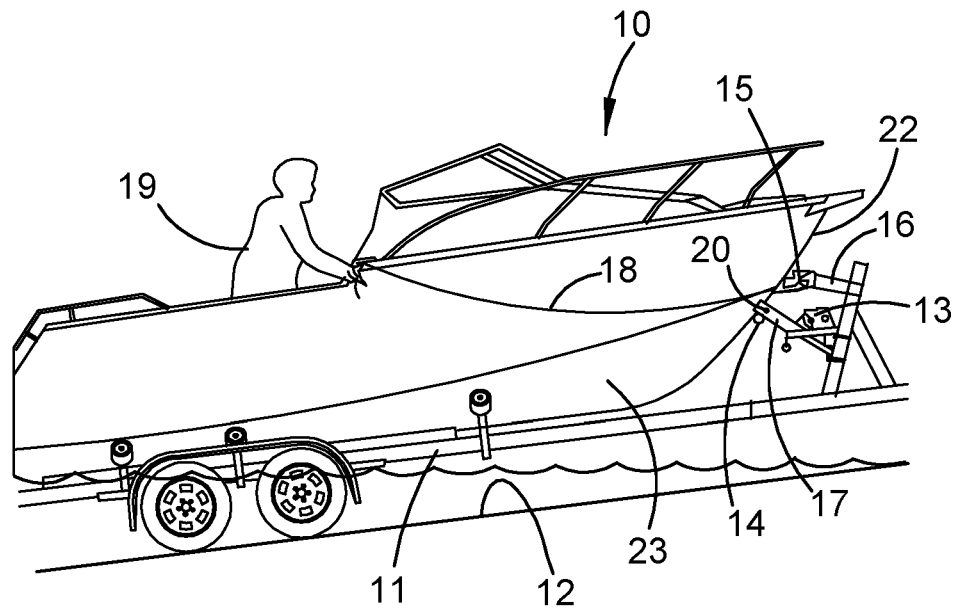
FIG. 1 is a view of a boat in a loaded position on a trailer.

FIG. 1 shows a boat 10 suitable for fitting with a bow stop according to the present invention. The boat 10 is shown in FIG. 1 loaded onto a trailer 11 which has been reversed into a shallow body of water along a boat ramp 12. The trailer 11 includes a winch 13, which can be secured to a first bow eye 14 (the winch is shown disconnected in FIG. 1), and the trailer 11 further includes a coupling 15 which is mounted on a structural member 16 of the trailer 11, and is coupled to a second bow eye (not visible in FIG. 1). The coupling 15 can be of the kind described in the Applicant's U.S. Pat. No. 8,408,578 and can be operated by a cord 18 that extends from the coupling 15 to the boat operator 19.

A bow stop 20 is mounted to one end of a further structural member of the trailer 11, which is a bow stop support structure or bow post 17. The bow stop 20 is centred on the apex 22 of the bow 23 of the boat 10 and extends to either side of the apex 22. The bow 23 rests against the bow stop 20 when the boat 10 is fully loaded onto the trailer 11

(in the position shown in FIG. 1) and remains in contact with the bow stop 20 during transport of the boat 10 on the trailer 11. The bow stop 20 forms a Vee configuration to extend to either side of the apex 22 and the Vee configuration operates to correct any misalignment of the bow 23 as the boat 20 moves onto the trailer 11 by causing the apex 22 of the bow 23 to shift to the centre of the bow stop 20. As described above, many existing bow stops have only a short or small catchment area to catch the bow 23 and so the boat operator needs to either be sufficiently skilled to align the bow with the bow stop as the boat is moving, or alternatively, the boat operator needs to use the 13 winch for the final part of the boat loading process.

Figure 2:
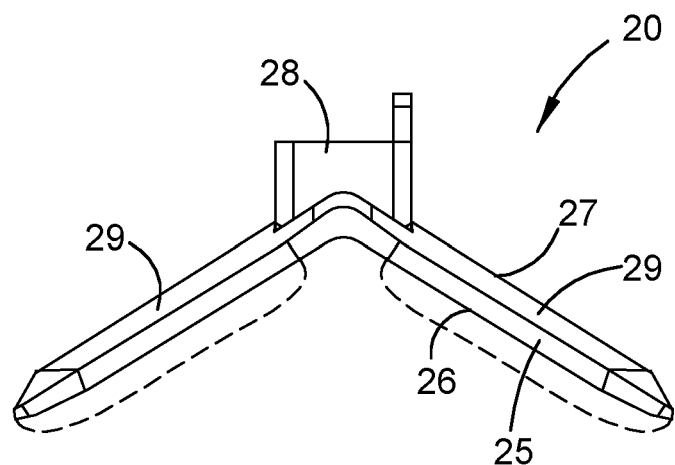
FIG. 2 is a plan view of a bow stop according to one embodiment of the invention.
Figure 3:
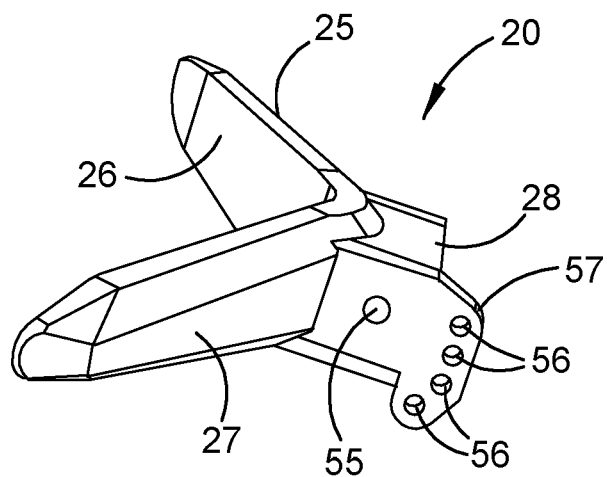
FIG. 3 is a side perspective view of the bow stop of FIG. 2.

The bow stop 20 is illustrated in detail in FIGS. 2 and 3. In those figures, the bow stop 20 includes a Vee portion 25 that has a flat front surface 26 and a rear surface 27. The bow stop 20 further includes a connection portion 28 for connection to a bow stop support structure of a trailer to which the bow stop 20 is to be installed.

The front surface 26 is Vee shaped and is formed on a pair of arms 29 that connect together at a central apex and extend in opposite directions. The arms 29 are the same length so that they are symmetrical about the central apex, although the arms could have different lengths if required. The rear surface 27 is also Vee shaped, but this is not essential. The height or depth of the arms 29 and the front surface 26 is greater towards the apex than at each of the opposite ends and the height or depth increases from the opposite ends to the apex at a constant rate.

The front surface 26 is a continuous surface, although in an alternative arrangement, the front surface could be discontinuous as shown by the broken lines in FIG. 2.

The bow stop 20 has a rigid body within a polymer cover, and the polymer cover overlies the front surface of the body. This arrangement will be described in more detail later herein.

Figure 4:
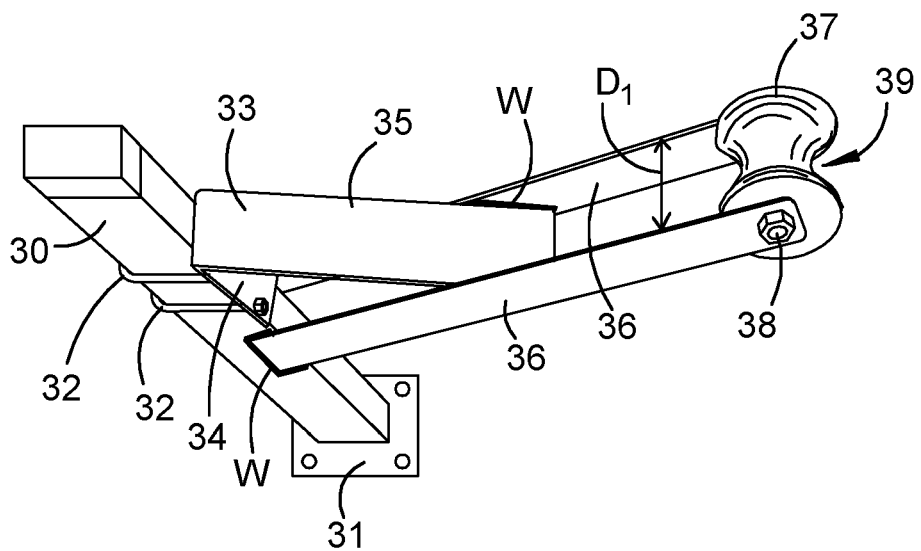
FIGS. 4 and 5 illustrate prior art bow stop structures.
Figure 5:
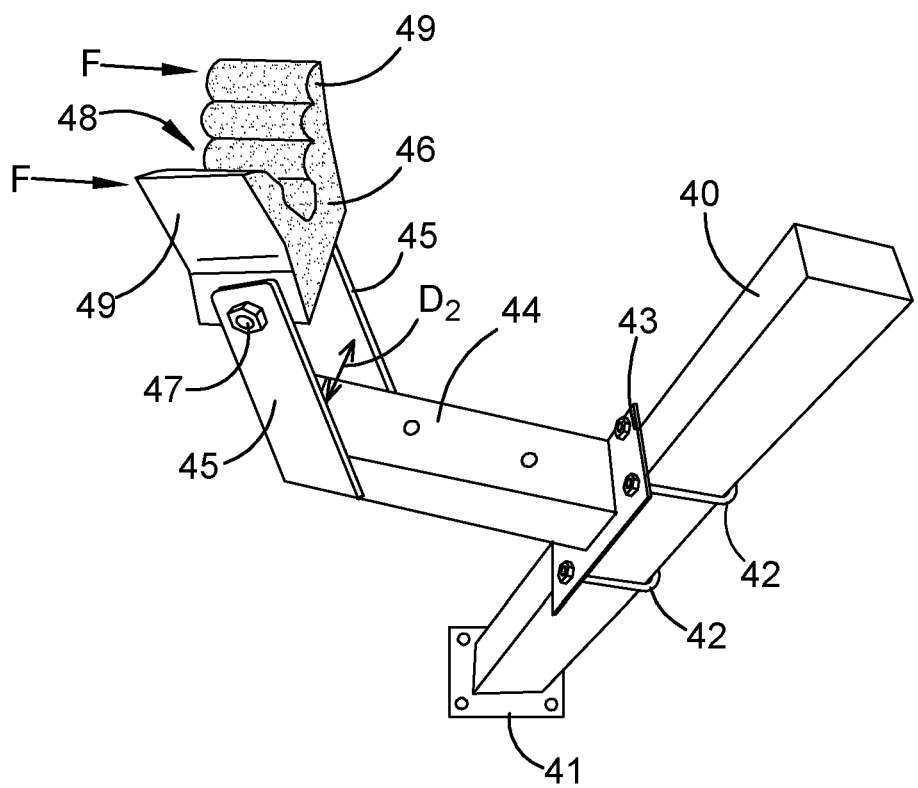

Typical structural arrangements for connecting a bow stop to a trailer are shown in FIGS. 1, 4 and 5. In FIG. 4, a post 30 extends from a mounting plate 31 which is used to fix the post 30 to the chassis of a trailer. Attached to the post 30 by a pair of U-bolts 32 is a plate 33 which has a post connection portion 34 and an extension portion 35. The connection portion 34 includes openings for accepting the ends of the U-bolts 32 so that nuts can be applied to the ends of the U-bolts 32 to fix the plate 33 to the post 30. The extension portion 35 extends at an angle to the connection portion 34 away from the post 30.

Bow stop arms 36 are welded to the post 30 and to the extension portion 35 of the plate 33. The welding points that are visible in FIG. 4 are identified by the letter W.

The arms 36 connect to a bow stop 37 at the ends of the arms 36 remote from the post 30. The bow stop 37 is circular and has a Vee portion 39 that presents a pair of facing conical surfaces that define a concave or Vee shaped surface. The bow stop 37 connects via a bolt 38 that extends through the centre of the bow stop 37. The bow stop 37 is intended to be rotatable about the bolt 38 when engaged by the bow of a boat. The dimension $D_1$ between the arms 36 (and thus the width of the bow stop 37) is in the order of about 75 mm.

FIG. 5 illustrates a different arrangement and a different form of bow stop to that of FIG. 4. The FIG. 5 arrangement includes a post 40 which extends from a mounting plate 41, which is used to fix the post 40 to the chassis of a trailer. Attached to the post 40 by a pair of U-bolts 42 is a plate 43. Welded to the plate 43 is an extension post 44 to which a pair of bow stop arms 45 extend. The bow stop arms 45 extend upwardly and connect to a bow stop 46 by a through bolt 47 that extends through the base of the bow stop 46.

The dimension $D_2$ shown in FIG. 5 is different to the dimension $D_1$ shown in FIG. 4 because the bow stop 46 is of a different form to the bow stop 37. However, common to both of the arrangements of FIGS. 4 and 5 is the provision of a pair of bow stop arms that connect to either side of a bow stop via a through bolt. The benefit of the bow stop 46 of FIG. 5 compared to the bow stop 37 of FIG. 4 is that the catchment area of the Vee portion 48 of the bow stop 46 is greater than that of the Vee portion 39 of the bow stop 37. This means that the bow stop 46 provides a boat operator with a greater catchment area to manoeuvre the bow of a boat into, as compared to the bow stop 37. The dimension $D_2$ is in the order of about 105 mm.

A disadvantage of the bow stop 46 is that the bow stop 46 can rotate about the axis of the through bolt 47 if the bow of a boat engages the bow stop 46 at a position other than within the Vee portion 48. For example, if the bow of a boat were to engage one of the inclined side walls 49 of the bow stop 46 at either of the points marked F, rather than engaging the Vee portion 48 between the side walls 49, then the bow stop 46 might be forced to rotate about the bolt 47 if the impact load is sufficient. Several different outcomes can arise from this, including that the bow will not nest within the Vee portion 48 and thus the boat will need to be reversed, the bow stop 47 repositioned and another attempt at loading the boat made. Alternatively, if the rotation of the bow stop 46 is only small, the bow may still enter the Vee portion 48, but with less than full contact with the Vee surface, so that the bow is not captured securely for transport. If this is not noticed, then transport of the boat might be made in a dangerous manner, while if it is noticed, then the bow stop 46 would need to be repositioned, potentially requiring the boat to be reversed and reloaded.

A further alternative outcome is that the impact load of the bow against the bow stop 46 could be such as to load the bow stop arms 45 unevenly and thus cause them to bend or otherwise distort, and thus requiring professional repair or replacement.

Figure 6:
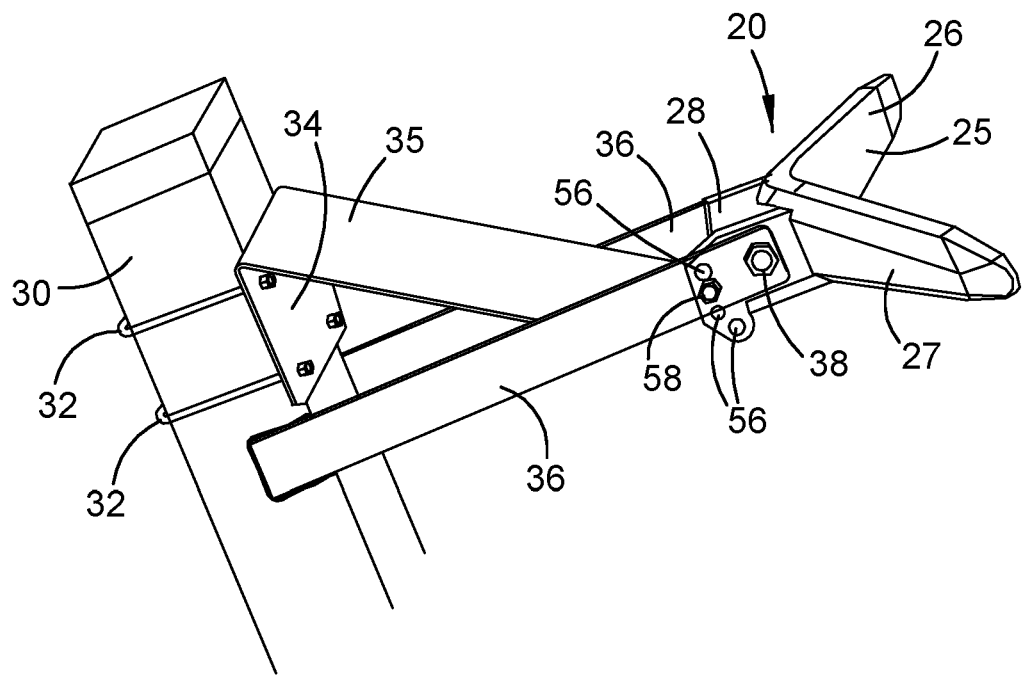
FIG. 6 illustrates a bow stop according to the present invention fitted to a prior art bow stop support structure.

FIG. 6 illustrates a portion of the FIG. 4 arrangement, whereby the same parts are given the same reference numerals. However, in FIG. 6, the bow stop 37 had been replaced with the bow stop 20 that is shown in FIGS. 2 and 3. For this installation, the bolt 38 is released to remove the bow stop 37 and the new bow stop 20 according to the invention is fitted between the bow stop arms 36. The bolt 38 is then reinserted through the bolt hole 55 (as shown in FIG. 3) that extends through the connection portion 28.

For anti-rotation purposes a further bolt can be inserted through one of the four openings 56 that are formed in the plate section 57 of the connection portion 28 and through an opening formed one of the arms 36. Thus, with the bow stop 20 installed between the bow stop arms 36, the installer can select whichever of the openings 56 overlies the adjacent arm 36 and can insert a drill through that opening to drill a complementary opening through the arm 36. With the opening formed, a further bolt can be inserted through the selected opening 56 and the opening thus formed in the arm 36 and by that arrangement, rotation of the bow stop 20 can be prevented. As shown in FIG. 6, the upper two openings 56 overlie the adjacent arm 36, while the bottom two openings 56 do not. The provision of the four openings 56 provides flexibility for installation of the bow stop 20 where different mounting arm arrangements are provided. Thus, the opening 56 which is selected for receipt of the bolt 58 may be different if the bow stop 20 is to be installed between the bow stop arms 45 of the FIG. 5 arrangement.

It will be readily appreciated from a comparison between FIGS. 4 and 6, that the catchment area for the bow of a boat is significantly greater via the installation of the bow stop 20 as compared to the bow stop 37. As explained earlier, the width of the bow stop 37 is approximately 75 mm whereas the width of the catchment area of the bow stop 20 is about 370 mm.

Moreover, it will be evident that installation of the bow stop 20 to replace the bow stop 37 is simple and does not require any particular skill. Still further, given that the connection portion 28 of the bow stop 20 is a rigid portion (preferably metal), the structural rigidity of the bow post support structure is enhanced as compared to the fully plastic bow stops illustrated in FIGS. 4 and 5.

As previously discussed, the width $D_1$ between the arms 36 of the FIG. 4 arrangement is different to the width $D_2$ between the arms 45 of the FIG. 5 arrangement, as the respective bow stops 37 and 46 are of different mounting widths. Accordingly, if the bow stop 20 according to the invention is dimensioned for close receipt between the arms 36 of FIG. 4, the connection portion 28 will not be appropriately configured for close receipt between the arms 45. Accordingly, the present invention provides an adjustment facility or an adjustment mechanism which is illustrated in FIG. 7.

Figure 7:
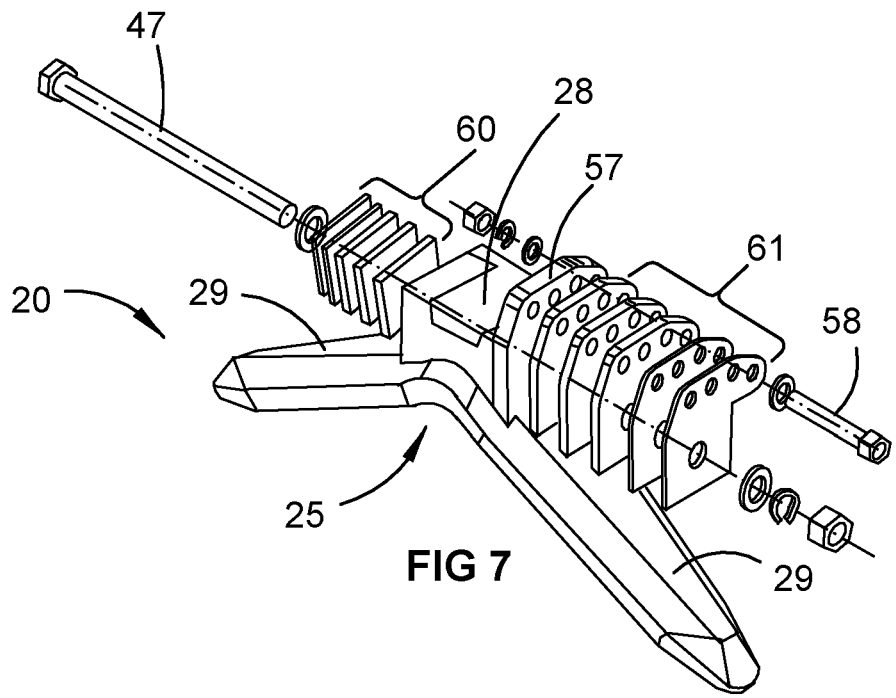
FIG. 7 is an exploded view of a bow stop according to the invention.

In FIG. 7, the bow stop 20 is illustrated facing downwardly, and the connection portion 28 is projecting upwardly. The adjustment facility is provided in the form of a series of spacers 60 and 61 that can be used as required on each side face of the connection portion 28 to take up any space between bow arms to which the bow stop 20 is to be connected. The spacers 60 are simply square spacers that include an opening through which the bolt 47 of FIG. 5 can extend, while the spacers 61 are configured to have a complementary shape to the plate section 57 of the bow stop 20 so that not only do the spacers 61 include an opening through which the bolt 47 can extend, they also include openings to align with the openings 56 of the plate section 57 in order to receive the bolt 58 as shown in FIG. 6.

The present invention thus covers a kit of parts which includes both the bow stop 20, bolts 47 and 58, spacers 60 and 61 and washers and nuts to connect with the bolts 47 and 58. By the use of the spacers 60 and 61, the connection portion 28 can remain centred between the bow stop arms that it is connected to while the arrangement provides great flexibility for the use of the bow stop 20 to replace many different sizes of existing bow stops.

Figure 8:
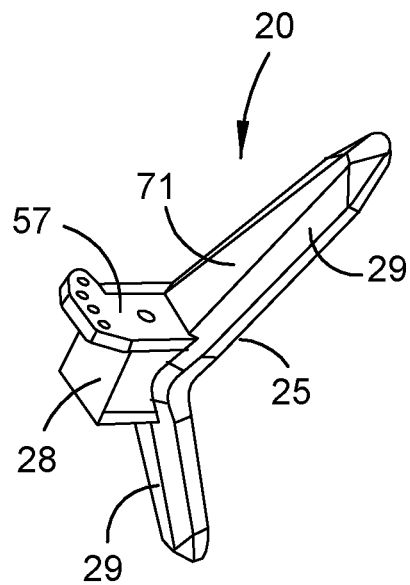
FIG. 8 is a perspective view of a bow stop according to the invention.
Figure 9:
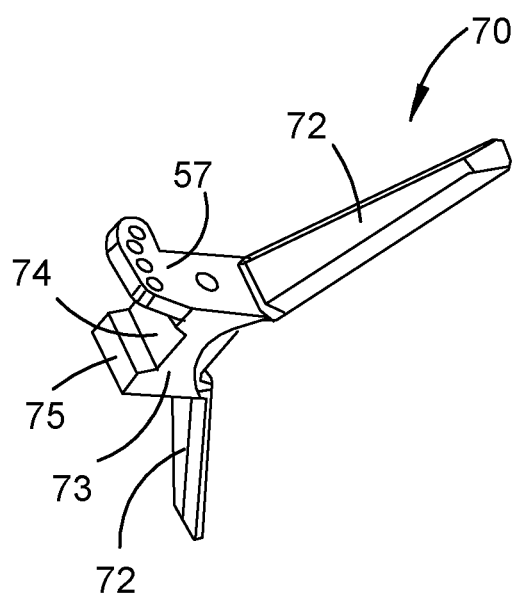
FIG. 9 is a perspective view of a body for use in a bow stop according to the present invention.

Bow stops according to the invention have both a rigid body and a polymer cover. FIGS. 8 and 9 make a side by side comparison of the bow stop 20 as illustrated in FIGS. 2 and 3, and the body 70 which forms part of the bow stop 20. The body 70 takes the same overall shape as the bow stop 20, and from FIG. 9, it can be seen that the body 70 is covered by the polymer cover 71 fully across the body arms 72. The polymer cover 71 also overlies other surfaces of the connection portion 73 other than opposite sides of the portion 73 including the plate section 57. The connection portion 73 includes a recess 74 through the rear surface 75 in order to locate the polymer cover over the connection portion 73 so that the polymer cover 71 will not shift relative to the rear surface and the other surfaces of the connection portion 73 over which it overlies. The recess 74 forms a keyway into which the polymer cover 71 extends.

The polymer cover does not overlie the side surface which is opposite to the plate section 57, as it is intended that the through bolt that is used to secure the bow stop 20 to a bow stop support structure, can engage against a metal surface on either side of the connection portion 28. Despite this, it is within the scope of the present invention for the polymer cover 71 to completely cover the connection portion 73, including the plate section 57, or to cover all of the connection portion 73 other than the plate section 57 as shown in the drawings.

It would be appreciated from FIG. 9, that the body 70 forms a major part of the bow stop 20 and that the arms 72 extend for substantially the full length of the arms 29 (FIG. 8). Thus, a boat bow which engages the arms 29 towards their distal or free ends, is nevertheless supported by the rigid arms 72 in order for the bow stop 20 to remain rigid and to support movement of the boat bow towards the apex of the Vee portion 25.

Moreover, the connection portion 73 forms a solid and rigid connector between the bow arms 36 or 45, thus providing for potentially greater structural rigidity of the bow stop support structure.

The polymer cover 71 can be moulded about the body 70 via any suitable moulding process and by completely enveloping the arms 72, the polymer cover can be firmly fixed in place as part of the bow stop 20. Extension of the polymer cover 71 about the connection portion 73 is optional, but there can be advantages in extending the polymer cover at least about the bottom rear and top surfaces of the connection portion 73.

The bow stop 20 as illustrated in the drawings provides various advantages over prior art bow stop as have been discussed above. Principally, the provision of a significantly greater catchment area and the ability for the bow stop 20 to be fitted to a variety of different and existing bow stop support structures, makes the bow stop 20 and other bow stops according to the invention easy and quick to install and provides boat operators with significantly improved likelihood of being able to drive directly onto the trailer and into a towing position.

Where any or all of the terms "comprise", "comprises", "comprised" or "comprising" are used in this specification (including the claims) they are to be interpreted as specifying the presence of the stated features, integers, steps or components, but not precluding the presence of one or more other features, integers, steps or components.

Those skilled in the art will appreciate that the invention described herein is susceptible to variations and modifications other than those specifically described. It is understood that the invention includes all such variations and modifications which fall within the spirit and scope of the present invention.

The invention claimed is:

1. A bow stop, including a Vee portion having a front, bow engaging concave surface and rear surface, and a connection portion for connection to a boat trailer, the Vee portion having a rigid body and a polymer cover, and the polymer cover overlying a front, Vee-shaped surface of the body, the connection portion being configured for positioning between a pair of spaced apart and generally parallel upstanding arms of a bow stop support structure of the trailer and the connection portion including a connector for connection to the upstanding arms, the bow stop further including an adjustment facility for adjusting a width of the connection portion, the adjustment facility comprising one or more spacers, shims or washers that are employed to increase the width of the connection portion.

2. A bow stop according to claim 1, the rigid body being formed in a Vee shape.

3. A bow stop according to claim 1, the rigid body being formed of metal.

4. A bow stop according to claim 1, the polymer cover completely covering the front surface of the body.

5. A bow stop according to claim 1, the rigid body having upper and lower surfaces between the front and rear surfaces and the polymer cover covering the front surface and the upper and lower surfaces of the body.

6. A bow stop according to claim 1, the polymer cover covering the rear surface of the rigid body.

7. A bow stop according to claim 1, the Vee portion and the connection portion being connected directly together.

8. A bow stop according to claim 7, the rigid body being formed integrally with the connection portion.

9. A bow stop according to claim 1, the concave front surface of the Vee portion having a substantially central apex and the front surface extending substantially symmetrically on either side of the apex.

10. A bow stop according to claim 1, the connection portion having a bolt or pin hole extending therethrough for accepting a bolt or pin.

11. A bow stop according to claim 1, the connection portion being formed as a block.

12. A bow stop according to claim 1, including an anti-rotation arrangement to prevent the bow stop from rotation once connected to a bow stop support.

13. A bow stop according to claim 12, the bow stop including a second connection portion in addition to the first connection portion with the second connection portion connecting to a different part of the trailer to the first connection portion.

14. A bow stop according to claim 13, the second connection portion including an opening to accept a bolt or pin to connect with a structural part of the trailer.

15. A bow stop according to claim 1, the front surface defining an included angle of about 120°.

16. A bow stop according to claim 1, the width or span Vee portion being about 370 mm.

17. A boat trailer having a bow stop support structure that includes a pair of spaced apart and generally parallel upstanding arms, and a bow stop that includes a Vee portion having a front, bow engaging concave surface and rear surface, a connection portion and an adjustment facility for adjusting a width of the connection portion comprising one or more spacers, shims or washers, the connection portion, or the connection portion and one or more spacers, shims or washers, being positioned between the pair of upstanding arms and being connected to the pair of upstanding arms by a connector, the Vee portion having a rigid body and a polymer cover, and the polymer cover overlying a front, Vee-shaped surface of the body.

* * * * *